UNITED STATES PATENT OFFICE.

PAUL COMMENT, OF MULHOUSE, FRANCE.

MANUFACTURE OF ZINC SULFID.

1,374,435.      Specification of Letters Patent.      Patented Apr. 12, 1921.

No Drawing.      Application filed April 23, 1919. Serial No. 292,096.

*To all whom it may concern:*

Be it known that I, PAUL COMMENT, a citizen of the Republic of Switzerland, residing in Mulhouse, Alsace, France, have invented certain new and useful Improvements in the Manufacture of Zinc Sulfid, of which the following is a specification.

In the invention described in the main application No. 167618, dated the 9th May, 1917, the preparation of anhydrous sulfid of zinc is carried out by means of anhydrous zinc persulfid, by calcination of the latter with anhydrous zinc sulfate, in the presence of an alkali-metal sulfate.

The present invention is for the purpose of extending the process to the application, in the preparation of anhydrous zinc sulfid, of polysulfids of zinc having the same action as persulfid.

The following example will enable the nature and scope of the present invention to be clearly understood.

Instead of persulfid of zinc, corresponding to the formula $ZnS_5$, the invention may also be carried out by employing any polysulfid of zinc, such for example as is obtained, with or without an admixture of zinc sulfid, by precipitating salts of zinc by means of varying quantities of alkali-metal or alkali-earth-metal polysulfids, or by any other means.

This will in particular be the case when the quantity of alkali-metal or alkali-earth-metal polysulfid is insufficient to form exactly $ZnS_5$, or when by other means, and with a view to decreasing the quantity of sulfurous acid produced during calcination, the zinc pentasulfid has for example been treated by means of alkaline lyes or solutions of alkali-metal or alkali-earth-metal sulfids for the purpose of eliminating therefrom a more or less considerable part of the sulfur, combined or free.

The polysulfid $ZnS_n$, in which $n$ can vary from 1 to 5, is prepared by double reaction between a solution of an alkali-metal (or alkali-earth metal) polysulfid and a solution of chlorid of zinc, using the theoretical proportions, $$ZnCl_2 + MS_n = ZnS_n + MCl_2$$

($MS_n$ being capable of being $Na_2S_3$, $Na_2S_4$, $BaS_3$, $BaS_4$, $BaS_5$, etc.).

The precipitated polysulfid of zinc, filtering well, is washed, dried, mixed with anhydrous sulfate of zinc, with or without anhydrous sodium sulfate, and then calcined, protected from the air, at a temperature between 500° and 800°.

Theoretical portions of zinc polysulfid and zinc sulfate are used with the addition of one molecular proportion of sodium sulfate, if desired.

*Example.*

$$2ZnSO_4 + ZnS_5 = 3ZnS + 4SO_2$$
$$(Na_2SO_4)\ \ (Na_2SO_4)$$

utilizing for 322 kilos of anhydrous sulfate of zinc, 228 kilos of polysulfid and 142 kilos of anhydrous sodium sulfate.

What I claim and desire to secure by Letters Patent of the United States is:—

1. A process for preparing anhydrous sulfid of zinc, stable against atmospheric agents and applicable in painting, comprising calcining a mixture comprising a polysulfid of zinc other than the persulfid and a salt of zinc comprising an oxygenated compound of sulfur.

2. A process for preparing anhydrous sulfid of zinc, stable against atmospheric agents and applicable in painting, comprising calcining a mixture comprising a polysulfid of zinc other than the persulfid and sulfate of zinc.

3. A process for preparing anhydrous sulfid of zinc, stable against atmospheric agents and applicable in painting, comprising calcining a mixture comprising a polysulfid of zinc other than the persulfid, an alkali-metal sulfate, and a salt of zinc comprising an oxygenated compound of sulfur.

4. A process for preparing anhydrous sulfid of zinc, stable against atmospheric agents and applicable in painting, comprising calcining a mixture comprising a polysulfid of zinc other than the persulfid, an alkali-metal sulfate and sulfate of zinc.

In witness whereof I have hereunto signed my name.

PAUL COMMENT.